WALL, ROBERTS & CARTER.
Mole Plow.
No. 27,604.             Patented Mar. 20, 1860.
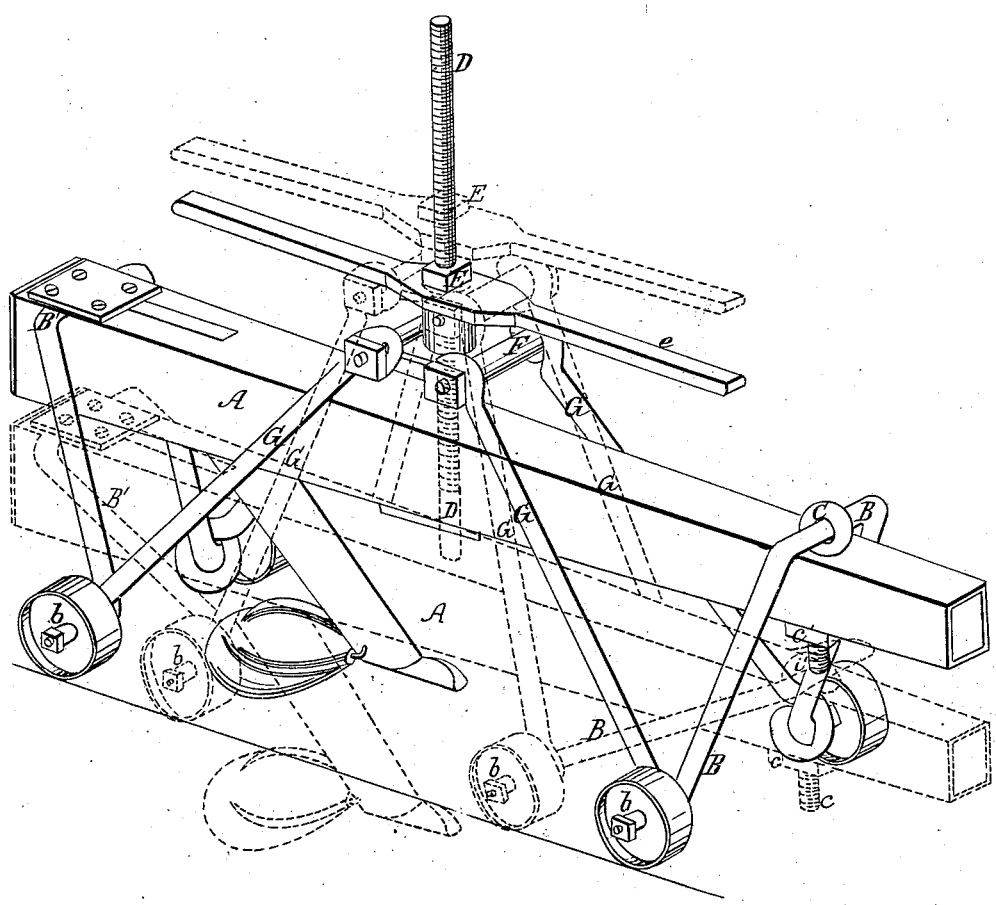

UNITED STATES PATENT OFFICE.

A. L. O. WALL, G. ROBERTS, AND M. S. CARTER, OF DECATUR, ILLINOIS.

IMPROVEMENT IN TRUCKS FOR MOLE-PLOWS.

Specification forming part of Letters Patent No. 27,604, dated March 20, 1860.

*To all whom it may concern:*

Be it known that we, A. LITTLE ONE WALL, GEORGE ROBERTS, and MILO S. CARTER, all of Decatur, in the county of Macon and State of Illinois, have invented certain new and useful Improvements in Trucks for Mole-Plows, of which the following is a full, clear, and exact description, reference being had to the accompanying drawing, which makes part of this specification, and which represents in perspective a machine to which our improvements are applied, the black lines showing the parts in the position they occupy when the beam which carries the colter, share, or mole of the plow is elevated to its greatest height from the ground, in which condition the machine can readily be transported from place to place without the plow being permitted to touch the earth, and the red lines showing the relative position of the parts when the beam is lowered sufficiently to permit the mole to be inserted into the ground to the depth at which the drain is to be made.

The utility of underground drainage is universally appreciated by all good farmers, and by none more than the tillers of the soil of the great West, where from the level nature of the country and the tenacity of the soil the crops are continually liable to injury from a superabundance of surface-moisture. Moreover, from the scarcity of running streams in this section of country it is of material advantage to graziers to be able to collect the water in ponds during the rainy season to supply their stock during dry weather, and this the underground drains enable them to do with great facility at a small expense and without accupying so much of the surface of the ground as the open ditches do. For these, among other, reasons the attention of many inventors has been directed to the improvement of this class of machinery, the result of which has been the production of numerous useful devices. Long experience and numerous experiments have, however, taught us the necessity and desirability of devising some means whereby to render the plow (which is a heavy, bulky, and cumbrous machine) more easy of carriage from place to place and more readily adjustable than those heretofore used, in order to meet the various requirements to which it is subjected while in operation. This desideratum we have at length obtained; and our invention consists in supporting the beam or plow upon wheels the axles of which turn in bearings at each end of the beam, and are bent at their ends and in their centers, (so as to resemble in shape the transverse section of a U-rail for railroads,) so that each wheel turns, as it were, upon a radius-bar, and connecting the axes of these wheels by means of link-rods to a plate or nut moving vertically upon a screwed spindle or standard rigidly secured to the center of the beam, by which arrangement we are enabled to raise or lower the beam (and consequently the mole or plow) rapidly and uniformly into any desired position, and to hold it in such position as long as may be necessary without any undue straining of particular parts, thus rendering the machine less liable to breakage or damage, and to support the entire frame upon the wheels, whether the plow be in operation or merely moving from place to place.

Our invention further consists in suspending the axle of the front wheels (arranged as above described) in an adjustable bearing or loop, whereby we are enabled to vary the angle of the beam relatively to as well as its height from the ground without impeding the operation of the mechanism for regulating the latter, which greatly assists the working of the machine. The adjustment of the height and angle of the beam has been accomplished in other machines, but not, so far as our knowledge extends, in so perfect or advantageous a manner as in ours. For instance, set-screws, levers, and a cord and windlass at one or both ends of the beam have been used; but in the first case only one end of the beam was adjustable, and in the second first one end of the beam had to be adjusted and then the other, there being no device in use, so far as we know, for adjusting both ends automatically and simultaneously.

In the accompanying drawing, the beam A is represented as resting upon four wheels having their bearings *b* in bent or cranked axles B B'. The front axle, B, has its bearings in a loop, C, the spindle or shank *c* of which passes vertically through a slot in the beam. The shank of this loop has a male screw cut upon it, and is adjusted or held in place by means of a nut, *c'*, and washer. By screwing this nut up or down on the shank the beam is raised or lowered upon it and the angle of the beam relatively to the ground correspondingly varied. The bearing of the rear axle, B', may likewise be made adjustable, if preferred by the constructer.

A vertical standard or spindle, D, having a screw-thread cut upon it, is erected and rigidly secured in the center of the beam A, from which it projects at a right angle. A nut, E, having a female screw cut in it, traverses up and down on the vertical spindle D, and is turned by the lever e. A plate, F, is secured to the nut by means of a collar in such manner that the nut may revolve freely within it as they traverse upon this spindle. The upper ends of a series of link-rods, G, are pivoted in any suitable manner to each corner of this plate, the lower end of each rod being pivoted to the journal or bearing of its corresponding wheel upon which the beam rests. In this manner a uniform movement of all the parts is obtained.

A shank or colter, to which the mole is usually attached, may be secured to the beam in any well-known manner. We prefer to use a shank and mole of the form and construction shown in the drawing; but as they form the subject-matter of separate Letters Patent issued simultaneously with this, and constitute no part of the invention herein claimed, a precise description of them here is deemed unnecessary.

The operation of the machine is as follows: When the plow is to be transported to the scene of operation the nut E is turned by means of the lever e until the parts assume the position shown by the black lines in the figure, when the beam will be raised sufficiently to permit of the ready removal of the machine without the shank and mole coming in contact with the ground, and thus obviate the necessity of detaching them even temporarily from the machine. When the point for the commencement of the drain is reached the motion of the lever e is reversed and the nut E rises, carrying the plate F and link-rods G, which causes the bearings of the supporting-wheels to describe arcs of circles (of which the axles B B' are the centers) toward the spindle D, and thus gradually and uniformly to lower the beam. As soon as the point of the colter touches the ground the plow is moved slowly forward by power applied in any suitable manner. The lowering of the beam being still continued, the colter enters the ground in an angular direction, taking the mole with it, until the desired depth is attained, when the lowering of the beam is stopped, and as the machine moves forward a perforation is made through the soil parallel to the surface of the ground over which the wheels roll.

The depth and grade or inclination of the drain can readily be regulated without stopping the machine by simply turning the lever e; and the amount of elevation or depression caused by one turn of the screw being ascertained, it affords an easy method of gaging the inclination or depth of the drain.

The adjustable bearing of the front axle affords a ready means of varying the angle of the beam relative to the ground, and this adjustment, when once made, does not impede the vertical adjustment of the machine produced by turning the lever e.

The colter can be withdrawn from the ground whenever desired by elevating the beam, as above described.

The play of the plate around the nut compensates for any slight irregularity in the movement of the parts and prevents any undue strain upon particular portions of the machinery.

Our machine is so simple in its construction that it can readily be made or repaired by any mechanic of ordinary intelligence. Its first cost is comparatively small, while from the strength and simplicity of its parts it is not liable to get out of order, and can consequently be operated with but little expense, while the readiness with which it can be adjusted gives it a wide range of applicability to the varying circumstances under which it is required to work.

What we claim as our invention, and desire to secure by Letters Patent, is—

1. The combination of the crank-axles B B', link-rods G, traveling plate F, and screwed spindle D, substantially as described, for the purposes set forth.

2. Supporting the front axle in an adjustable bearing, when arranged and operated substantially as described, for the purpose set forth.

In testimony whereof we have hereunto subscribed our names.

A. L. O. WALL.
    GEORGE ROBERTS.
    M. S. CARTER.

Witnesses:
 JONES McWILLIAMS,
 ISAAC FREESE, Jr.